(12) United States Patent
Zhao et al.

(10) Patent No.: US 9,529,216 B2
(45) Date of Patent: Dec. 27, 2016

(54) METHOD FOR MANUFACTURING LIQUID CRYSTAL ALIGNMENT FILM AND REACTION APPARATUS FOR MANUFACTURING THE SAME

(71) Applicant: SHENZHEN CHINA STAR OPTOELECTRICS TECHNOLOGY CO., LTD., Shenzhen, Guangdong (CN)

(72) Inventors: Rentang Zhao, Guangdong (CN); Chung-Ching Hsieh, Guangdong (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 0 days.

(21) Appl. No.: 14/648,861

(22) PCT Filed: Feb. 12, 2015

(86) PCT No.: PCT/CN2015/072864
§ 371 (c)(1),
(2) Date: Jun. 1, 2015

(87) PCT Pub. No.: WO2016/123818
PCT Pub. Date: Aug. 11, 2016

(65) Prior Publication Data
US 2016/0231601 A1 Aug. 11, 2016

(30) Foreign Application Priority Data
Feb. 6, 2015 (CN) .......................... 2015 1 0061966

(51) Int. Cl.
G02F 1/1337 (2006.01)
G02F 1/13 (2006.01)
G02F 1/1341 (2006.01)

(52) U.S. Cl.
CPC .......... *G02F 1/1303* (2013.01); *G02F 1/1341* (2013.01); *G02F 1/133711* (2013.01); *G02F 1/133788* (2013.01); *G02F 2001/133715* (2013.01)

(58) Field of Classification Search
CPC G02F 1/1303; G02F 1/1341; G02F 1/133711; G02F 1/133788
See application file for complete search history.

(56) References Cited

U.S. PATENT DOCUMENTS

| 2010/0231830 A1* | 9/2010 | Hirakata | G02B 1/105 349/85 |
| 2012/0026442 A1* | 2/2012 | Nakanishi | C09K 19/322 349/123 |
| 2013/0089662 A1* | 4/2013 | Hoshi | B29D 11/00788 427/162 |

\* cited by examiner

*Primary Examiner* — Joseph L Williams
(74) *Attorney, Agent, or Firm* — Hauptman Ham, LLP (57) ABSTRACT

A method for manufacturing a liquid crystal alignment film and a reaction apparatus are provided, the method has steps of: disposing a liquid crystal cell onto a first reaction apparatus, and providing a temperature value, a voltage value, and an ultraviolet radiation, so that a liquid crystal alignment monomer in the liquid crystal cell generates a polymerization reaction; transferring the liquid crystal to a second reaction apparatus if the transferring time threshold value is reached; determining whether the liquid crystal cell is transferred to the second reaction apparatus or not; executing a warning if the liquid crystal cell is not transferred to the second reaction apparatus; and lifting the liquid crystal cell away from a platform of the first reaction apparatus through an ejector pin disposed in the platform thereof if the dangerous time threshold value is reached.

14 Claims, 4 Drawing Sheets

METHOD FOR MANUFACTURING LIQUID CRYSTAL ALIGNMENT FILM AND REACTION APPARATUS FOR MANUFACTURING THE SAME

CROSS-REFERENCE TO RELATED APPLICATIONS

This application claims the benefit of priority to PCT Filing Application No.: PCT/CN2015/072864, filed on Feb. 12, 2015, and China Patent Application No.: 201510061966.0, filed on Feb. 6, 2015, both of which are hereby incorporated by reference as if fully set forth herein.

FIELD OF THE INVENTION

The present invention relates to the production technology of liquid crystal, and more particularly to a method for manufacturing a liquid crystal alignment film and a reaction apparatus for manufacturing the same.

BACKGROUND OF THE INVENTION

In order to fulfill the development requirements of large-size and wide angle LCD panels, a multi-domain vertical alignment (MVA) model has been widely developed by the LCD panel manufacturers. The process of the multi-domain vertical alignment model comprises a protrusion formed in an inner surface of a substrate by a reactive monomer (RM) during the curing process. The protrusion has a predetermined angle for forming an alignment film so that the liquid crystal becomes stationary after tending at an angle. The multi-domain vertical alignment model has advantages such as a wide viewing angle and high definition.

Figure 1:
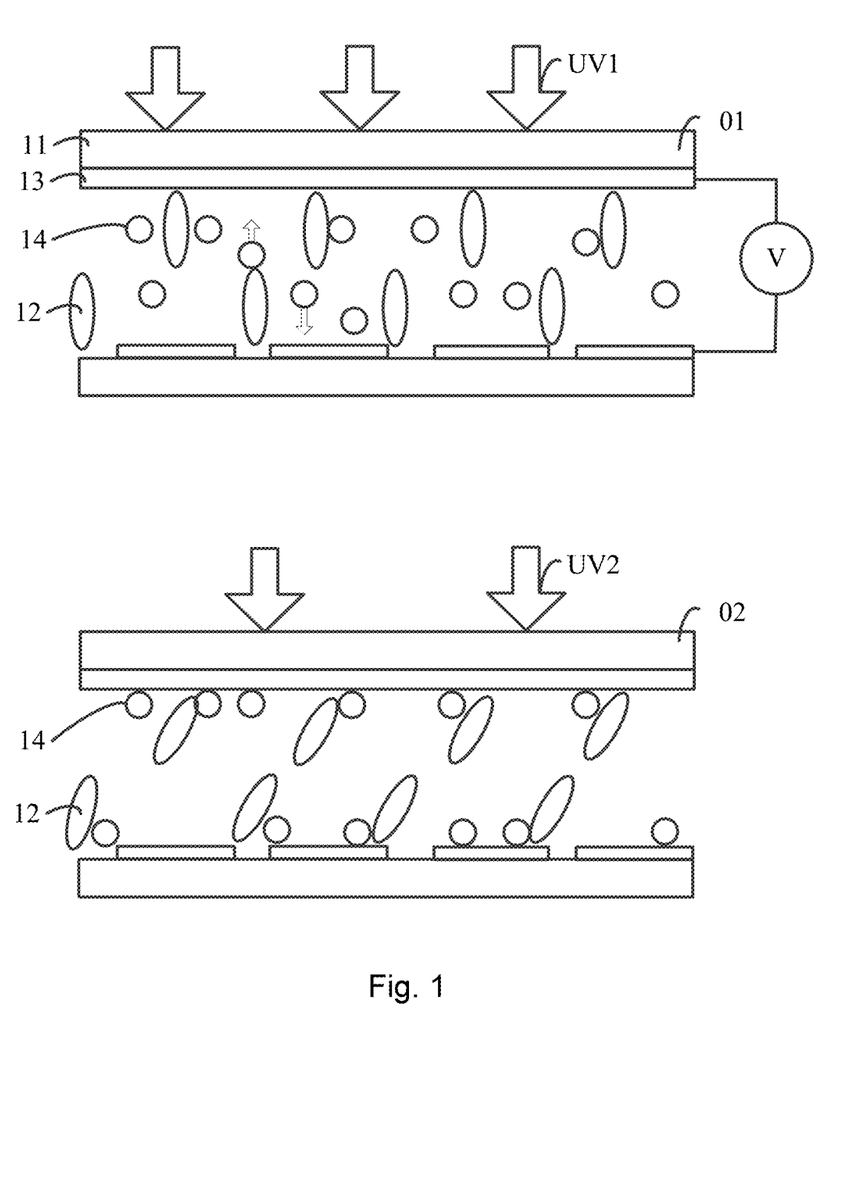
FIG. 1 is a flowchart of a conventional process of forming the alignment film.

Refer to FIG. 1, which is a flowchart of a process of forming an alignment film. The process comprises providing a voltage V, a first ultraviolet light (UV1) illumination, and a heating temperature in a first reaction machine 01 for the reactive monomer 14 to perform a reaction. The reactive monomer 14 moves to a first substrate 11 or a second substrate 12 to form an alignment film 13 for liquid crystal molecules 12 being deflected. Generally, the voltage is no longer applied when the first ultraviolet light (UV1) illumination is fully illuminated. A liquid crystal cell enters into a second reaction machine 02 to be irradiated by a second ultraviolet light for the reaction of the remaining reactive monomer 14 to be completed.

However, since the internal structure of the first reaction machine is complex, the first reaction machine might malfunction after running for a long time. Once the first reaction machine malfunctions, the liquid crystal cell inside the first reaction machine generates mura because the liquid crystal cell cannot be promptly removed, which can damage the quality of the LCD display.

SUMMARY OF THE INVENTION

In view of this, the present invention provides a method for manufacturing a liquid crystal alignment film and a reaction apparatus for manufacturing the liquid crystal alignment film to solve the problem of the first reaction machine malfunctioning and thereby resulting in damage to the quality of the LCD display in the conventional technology.

In order to solve the aforementioned drawbacks of the prior art, the embodiment of the present invention provides a method for manufacturing a liquid crystal alignment film comprising the following steps of:

disposing a liquid crystal cell onto a platform of a first reaction apparatus, and controlling a temperature range, a voltage range and an ultraviolet radiation for the liquid crystal cell, so that a liquid crystal alignment monomer of the liquid crystal cell generates a polymerization reaction;

determining whether a period of time of the liquid crystal cell staying in the first reaction apparatus reaches a transferring time threshold value;

transferring the liquid crystal cell to a second reaction apparatus if the transferring time threshold value is reached;

determining whether the liquid crystal cell is transferred to the second reaction apparatus or not;

if the liquid crystal cell is transferred to the second reaction apparatus, then returning the period of time of the liquid crystal cell in the second reaction apparatus to zero and re-counting the time;

if the liquid crystal cell is not transferred to the second reaction apparatus, executing a warning by means of a sound, a flash, and/or a message for moving out the liquid crystal cell;

determining whether a period of time of the liquid crystal cell staying in the first reaction apparatus reaches a dangerous time threshold value; and lifting the liquid crystal cell away from the platform of the first reaction apparatus through an ejector pin disposed in the platform thereof if the dangerous time threshold value is reached.

In the method for manufacturing a liquid crystal alignment film described above, the transferring time threshold value is 4 to 5 minutes, and the dangerous time threshold value is 5 to 6 minutes.

In the method for manufacturing a liquid crystal alignment film described above, in the step of lifting the liquid crystal cell away from the platform of the first reaction apparatus through the ejector pin disposed in the platform thereof if the dangerous time threshold value is reached, a length of the ejector pin is greater than or equal to 5 mm.

In the method for manufacturing a liquid crystal alignment film described above, before the step of disposing the liquid crystal cell onto the platform of the first reaction apparatus, further comprising the following steps of:

preparing a liquid crystal mixture comprising liquid crystal molecules and the liquid crystal alignment monomer; and preparing the liquid crystal cell comprising a first substrate and a second substrate wherein the liquid crystal mixture is injected therebetween and then the first substrate and the second substrate are sealed for forming the liquid crystal cell.

In order to solve the aforementioned drawbacks of the prior art, the embodiment of the present invention provides a method for manufacturing a liquid crystal alignment film comprising the following steps of:

disposing a liquid crystal cell onto a platform of a first reaction apparatus, and controlling a temperature range, a voltage range and an ultraviolet radiation for the liquid crystal cell, so that a liquid crystal alignment monomer of the liquid crystal cell generates a polymerization reaction;

determining whether a period of time of the liquid crystal cell staying in the first reaction apparatus reaches a transferring time threshold value;

transferring the liquid crystal to a second reaction apparatus if the transferring time threshold value is reached;

determining whether the liquid crystal cell is transferred to the second reaction apparatus or not;

executing a warning if the liquid crystal cell is not transferred to the second reaction apparatus;

determining whether a period of time of the liquid crystal cell staying in the first reaction apparatus reaches a dangerous time threshold value; and lifting the liquid crystal cell away from the platform of the first reaction apparatus through an ejector pin disposed in the platform thereof if the dangerous time threshold value is reached.

In the method for manufacturing a liquid crystal alignment film described above, the transferring time threshold value is 4 to 5 minutes, and the dangerous time threshold value is 5 to 6 minutes.

In the method for manufacturing a liquid crystal alignment film described above, after the step of determining whether the liquid crystal cell is transferred to the second reaction apparatus or not, further comprising the following step of: if the liquid crystal cell is transferred to the second reaction apparatus, then returning the period of time of the liquid crystal cell in the second reaction apparatus to zero and re-counting the time.

In the method for manufacturing a liquid crystal alignment film described above, if the liquid crystal cell is not transferred to the second reaction apparatus, the step of executing the warning comprises: executing the warning by means of a sound, a flash, and/or a message for moving out the liquid crystal cell.

In the method for manufacturing a liquid crystal alignment film described above, in the step of lifting the liquid crystal cell away from the platform of the first reaction apparatus through the ejector pin disposed in the platform thereof if the dangerous time threshold value is reached, a length of the ejector pin is greater than or equal to 5 mm.

In the method for manufacturing a liquid crystal alignment film described above, before the step of disposing the liquid crystal cell onto the platform of a first reaction apparatus, further comprising the following steps of:

preparing a liquid crystal mixture comprising liquid crystal molecules and the liquid crystal alignment monomer; and preparing the liquid crystal cell comprising a first substrate and a second substrate wherein the liquid crystal mixture is injected therebetween and then the first substrate and the second substrate are sealed for forming the liquid crystal cell.

In order to solve the aforementioned drawbacks of the prior art, the embodiment of the present invention provides a liquid crystal alignment film reaction apparatus for manufacturing the liquid crystal alignment film through a polymerization reaction processed in a liquid crystal cell, comprising:

a temperature control module disposed on a platform adapted for presetting a temperature range;

a voltage module adapted for providing a default voltage range;

an ultraviolet module adapted for providing a default illumination ultraviolet light;

a timing module adapted for counting a time after the liquid crystal cell is disposed onto the platform;

a first determining module adapted for determining whether a current counting time reaches a transferring time threshold value;

a transfer module adapted for transferring the liquid crystal cell to a second reaction apparatus if the current counting time reaches the transferring time threshold value;

a second determining module adapted for determining whether the liquid crystal cell is transferred to the second reaction apparatus or not;

a warning module adapted for executing a warning if the liquid crystal cell is not transferred to the second reaction apparatus;

a third determining module adapted for determining whether the current counting time reaches a dangerous time threshold value; and a control module adapted for lifting the liquid crystal cell away from the platform through an ejector pin disposed in the platform if the dangerous time threshold value is reached.

In the reaction apparatus described above, the transferring time threshold value is 4 to 5 minutes, and the dangerous time threshold value is 5 to 6 minutes.

In the reaction apparatus described above, a length of the ejector pin is greater than or equal to 5 mm.

In the reaction apparatus described above, the warning module executes the warning by means of a sound, a flash, and/or a message.

In comparison with the conventional technology, the present invention can determine the timing and remove the liquid crystal cell away from the platform of the reaction apparatus for preventing the liquid crystal cell from staying too long and thereby generating mura.

DESCRIPTION OF THE DRAWINGS

To make the above embodiments of the invention more comprehensible, the preferred embodiments being adopted by the present invention to achieve the above and other objectives can be best understood by referring to the following detailed description of the preferred embodiments and the accompanying drawings as detailed below. Obviously, one having ordinary skill in the art, without any creative work, can also obtain other drawings based on these drawings.

DETAILED DESCRIPTION OF THE PREFERRED EMBODIMENTS

Referring to the drawings of the present invention, the same symbol represents the same component. The embodiments are chosen and described in order to best explain the principles of the present invention; it is to be understood that the present invention is not limited thereto.

Embodiment 1

Figure 2:
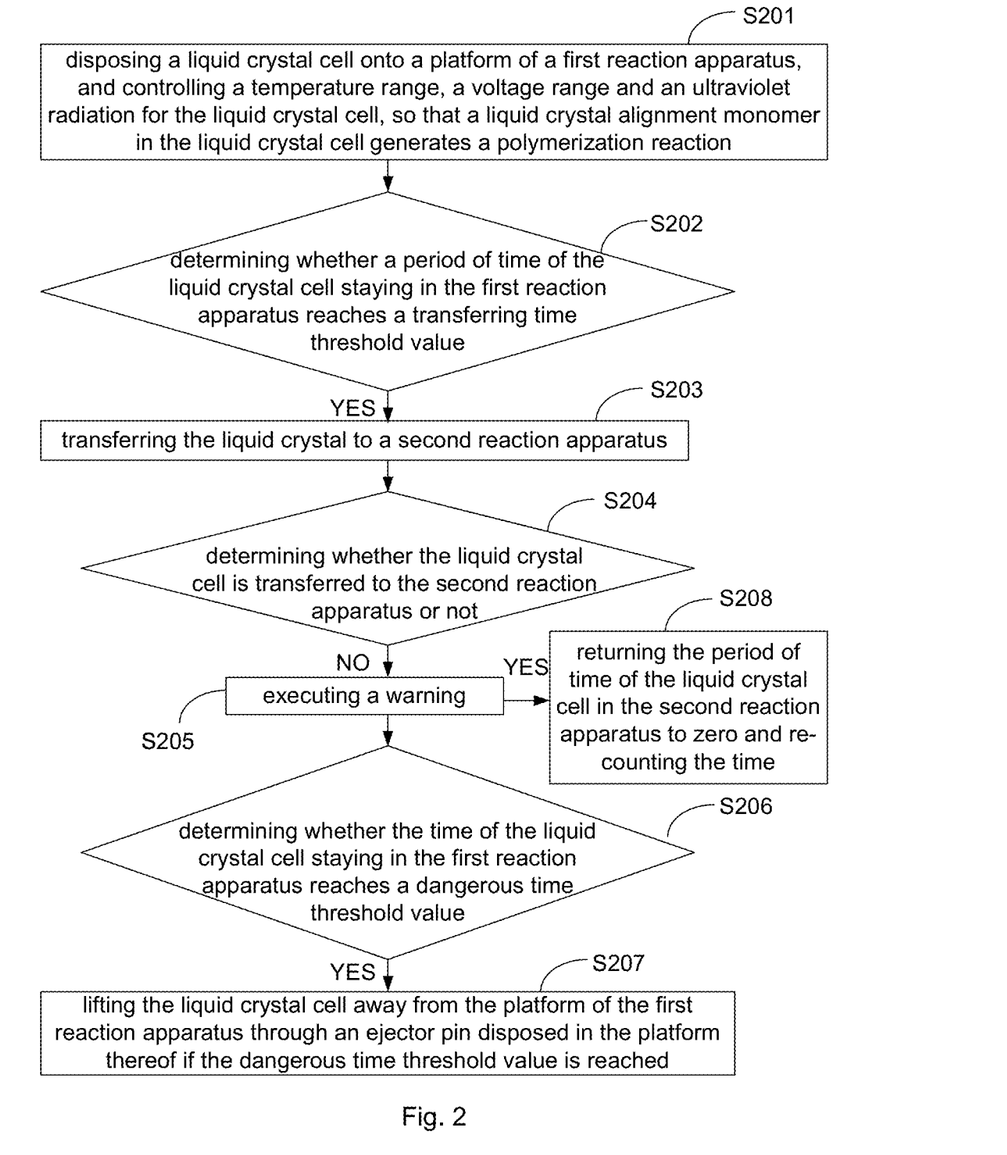
FIG. 2 is a flowchart of a method for manufacturing a liquid crystal alignment film according to a first embodiment of the present invention.

Refer to the FIG. 2, which is a flowchart of a method for manufacturing a liquid crystal alignment film according to a first embodiment of the present invention.

In a step S201, a liquid crystal cell is disposed onto a platform of a first reaction apparatus, and controlling a temperature range, a voltage range and an ultraviolet radiation for the liquid crystal cell, so that a liquid crystal alignment monomer of the liquid crystal cell generates a polymerization reaction.

The voltage of the first reaction apparatus is 7V-50V, the illuminance of the ultraviolet radiation is 0.05 MW/cm-120 MW/cm, and the temperature range is 25° C.-80° C.

Moreover, it can be understood that before the step of disposing the liquid crystal cell onto the platform of a first reaction apparatus further comprises the following steps of:

(1) preparing a liquid crystal mixture comprising liquid crystal molecules and the liquid crystal alignment monomer, the selection of the liquid crystal alignment monomer and a ratio of the liquid crystal alignment monomer in the liquid crystal mixture will affect a time threshold value described later;

(2) preparing the liquid crystal cell comprising a first substrate and a second substrate wherein the liquid crystal mixture is injected therebetween and then the first substrate and the second substrate are sealed for forming the liquid crystal cell. Nevertheless, in the step of the first substrate and the second substrate being sealed, the first substrate and the second substrate can be shifted for a predetermined distance until a voltage contact point of the second substrate is exposed so as to receive the voltage provided by the first reaction apparatus.

In this embodiment of the present invention, the liquid crystal alignment monomer is usually selected from aromatic. The ratio of the liquid crystal alignment monomer in the liquid crystal mixture can be 2000 PPM-5000 PPM. After the polymerization reaction is completed, the best alignment effect can be achieved and the following time threshold value is also based thereon.

In the first reaction apparatus, the liquid crystal alignment monomer in the liquid crystal cell processes the polymerization reaction, and a protrusion is formed from the first substrate or the second substrate.

In a step S202, whether a period of time of the liquid crystal cell staying in the first reaction apparatus reaches a transferring time threshold value is determined. If the transferring time threshold value is not reached, the period of time continues to be determined. If the transferring time threshold value is reached, a step S203 is executed.

The transferring time threshold value can be set to be between 4 to 5 minutes. It can be understood that due to there being a difference between a dimension of the liquid crystal cell and a proportion of the liquid crystal alignment monomer, the transferring time can be adjusted accordingly.

In the step S203, the liquid crystal cell is transferred to a second reaction apparatus if the transferring time threshold value is reached.

It can be understood that the transfer includes a manual transfer or an automatic transfer conveyor.

In a step S204, determining whether the liquid crystal cell has been transferred to the second reaction apparatus or not. Besides, if the liquid crystal cell is not transferred to the second reaction apparatus, then a step S205 is executed. If the liquid crystal cell is transferred to the second reaction apparatus, then a step S208 is executed.

In the step S205, if the liquid crystal cell is not transferred to the second reaction apparatus, a warning is processed.

It can be understood that the warning can be a sound, a flash, and/or a message for moving the liquid crystal cell out of the first reaction apparatus. The message can be displayed on the first reaction apparatus, a computer connected with the first reaction apparatus, or transferred to a mobile device such as a staff's cell phone.

In a step S206, determining whether a period of time of the liquid crystal cell staying in the first reaction apparatus reaches a dangerous time threshold value.

The dangerous time threshold value can be set between 5 to 6 minutes. It can be understood that due to there being a difference between the dimension of the liquid crystal cell and the proportion of the liquid crystal alignment monomer, the transferring time can be adjusted accordingly.

In a step S207, the liquid crystal cell is lifted away from the platform of the first reaction apparatus through an ejector pin/pins disposed in the platform thereof if the dangerous time threshold value is reached.

It can be understood that a length of the ejector pin is greater than or equal to 5 mm so that the liquid crystal cell is away from the thermal of the platform.

In the step S208, if the liquid crystal cell is transferred to the second reaction apparatus, then returning the period of time of the liquid crystal cell in the second reaction apparatus to zero and re-counting the time.

It can be understood that the step S201 will be repeated after executing the step S208, and the above steps will be repeated. Until the liquid crystal cell is not transferred to the second reaction apparatus, the step S205 is executed.

At the same time, after the liquid crystal cell is transferred to the second reaction apparatus, the liquid crystal cell stays in the second reaction apparatus. The liquid crystal alignment monomer of the liquid crystal cell carries on the polymerization reaction so as to form the liquid crystal alignment film on the first substrate or the second substrate. The liquid crystal alignment film makes the liquid crystal generate a predetermined angle and form a multi-domain vertical alignment (MVA) mode for fulfilling the large-size and wide angle LCD panels.

In the present invention, the period of time of the liquid crystal cell staying in the first reaction apparatus can be divided into three sections by the transferring time threshold value and the dangerous time threshold value.

In the first section, the liquid crystal cell is moved out in the beginning.

In the second section, if the liquid crystal cell is not moved out, the warning is processed.

In the first section, if the liquid crystal cell is not moved out, the liquid crystal cell will be lifted away from the platform through the ejector pin disposed in the platform for preventing the liquid crystal cell from staying too long and thereby generating mura.

Embodiment 2

Figure 3:
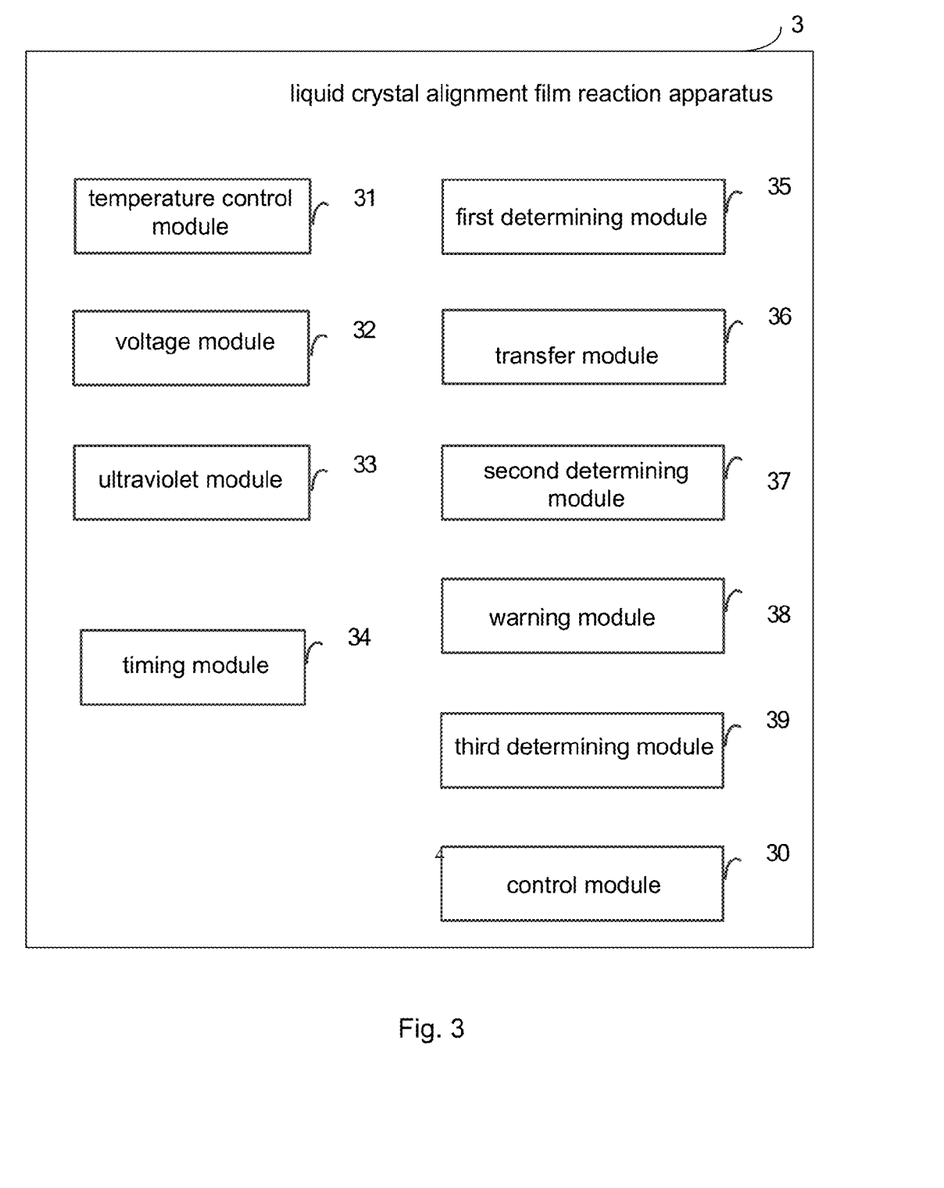
FIG. 3 is a schematic view of modules of a liquid crystal alignment film reaction apparatus according to a second embodiment of the present invention.

Refer to the FIG. 3, which is a schematic view of modules of a liquid crystal alignment film reaction apparatus of the present invention. The reaction apparatus 3 comprises a first reaction apparatus for executing the polymerization reaction in the liquid crystal cell and forming the liquid crystal alignment film.

The liquid crystal alignment film reaction apparatus 3 comprises a temperature control module 31, a voltage module 32, an ultraviolet module 33, a timing module 34, a first determining module 35, a transfer module 36, a second determining module 37, a warning module 38, a third determining module 39, and a control module 30.

The temperature control module 31 is disposed on a platform adapted for presetting a temperature range.

It can be understood that the temperature control module 31 mainly processes a thermal conductivity through contacting. Namely, only when the temperature control module 31 contacts the platform will the thermal conductivity be processed, instead of providing a furnace heating environment. A temperature range provided by the temperature control module 31 is 25° C. −80° C.

The voltage module 32 is adapted for providing a default voltage range.

It can be understood that the voltage module 32 transmits a voltage through connecting a voltage contact point on the liquid crystal cell. The voltage is 7V-50V.

The ultraviolet module 33 is adapted for providing a default illumination ultraviolet light.

An illuminance of the ultraviolet radiation is 0.05 MW/cm-120 MW/cm.

The timing module 34 is adapted for counting time after the liquid crystal cell is disposed on the platform and for re-counting the time after the liquid crystal cell is moved from the platform and the period of time is set to be zero.

The first determining module 35 is adapted for determining whether a period of time of the liquid crystal cell staying on the platform reaches the transferring time threshold value.

The transferring time threshold value is 4 to 5 minutes. It can be understood that due to a difference between the dimension of the liquid crystal cell and the proportion of the liquid crystal alignment monomer, the transferring time can be adjusted accordingly.

The transfer module 36 is adapted for transferring the liquid crystal cell to a second reaction apparatus if the period of time reaches the transferring time threshold value.

The second determining module 37 is adapted for determining whether the liquid crystal cell is transferred to the second reaction apparatus or not.

It can be understood that the second determining module 37 only determines whether the liquid crystal cell is moved away from the currently reaction apparatus 3, and does not determine whether the liquid crystal cell arrives in the second reaction apparatus.

The warning module 38 is adapted for executing a warning if the liquid crystal cell is not transferred to the second reaction apparatus.

It can be understood that the warning can be a sound, a flash, and/or a message. When the staff is on duty, the staff can take out the liquid crystal cell in manual or semi-automatic manner from the reaction apparatus.

The third determining module is adapted for determining whether the period of time of the liquid crystal cell staying on the platform reaches a dangerous time threshold value.

The dangerous time threshold value is 5 to 6 minutes. It can be understood that due to a difference between the dimension of the liquid crystal cell and the proportion of the liquid crystal alignment monomer, the transferring time can be adjusted accordingly.

The control module 30 is adapted for lifting the liquid crystal cell through an ejector pin disposed in the platform if the dangerous time threshold value is reached, so that the liquid crystal cell is moved away from the platform.

It can be understood that a length of the ejector pin is greater than or equal to 5 mm so that the liquid crystal cell is far from the thermal of the platform.

In the present invention, the period of time of the liquid crystal cell staying in the reaction apparatus can be divided into three sections by the transferring time threshold value and the dangerous time threshold value.

In the first section, the liquid crystal cell is moved out in the beginning.

In the second section, if the liquid crystal cell is not moved out, the warning is processed.

In the first section, if the liquid crystal cell is not moved out, the liquid crystal cell will be lifted through the ejector pin disposed in the platform so that the liquid crystal cell is moved away from the platform for preventing the liquid crystal cell from staying too long and thereby generating mura.

Embodiment 3

Figure 4:
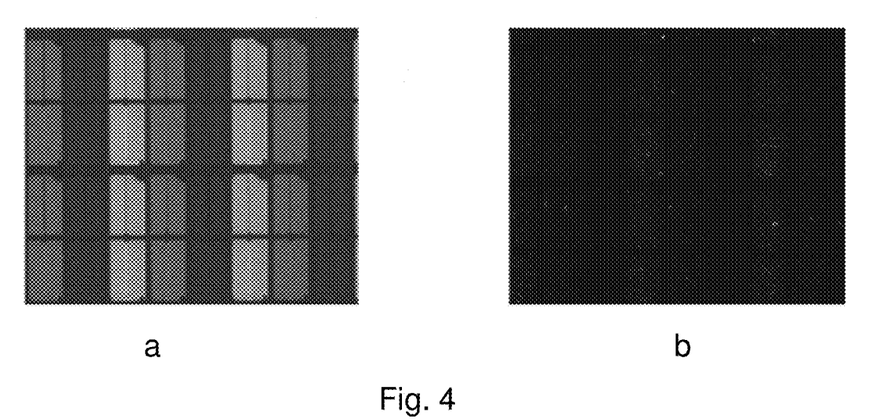
FIG. 4 is a schematic view of the verification result to the method for manufacturing a liquid crystal alignment film and the reaction apparatus according to a third embodiment of the present invention.

Refer to FIG. 4, which is a schematic view of the verification result to the method for manufacturing a liquid crystal alignment film and the reaction apparatus of the present invention.

"a" is a liquid crystal cell produced by the method for manufacturing a liquid crystal alignment film and the reaction apparatus of the present invention, "b" is a liquid crystal cell not produced by the method for manufacturing a liquid crystal alignment film and the reaction apparatus of the present invention. Certainly, that means a situation in which the reaction apparatus has malfunctioned.

The experimental results:

(1) If the liquid crystal cell is not removed in a timely manner from the reaction apparatus after Illuminating and applying a voltage completely, the liquid crystal cell stays too long on the platform of the reaction apparatus. With a heating effect of the platform, reactive monomers will continue the reaction. The reactive monomers occurs an aggregation effect in the reaction. Since the voltage is not applied to the reactive monomers for generating a dumping effect to the reactive monomers, the aggregated reactive monomers act on the liquid crystal molecules and form crushed bright spots.

(2) The crushed bright spots make an LCD panel low-contrast, and the partial crushed bright spots causes LCD panel mura and uneven illustration.

(3) The method for manufacturing the liquid crystal alignment film and the reaction apparatus of the present invention is adapted for manufacturing the liquid crystal alignment film without mura.

It can be understood that although each of the above embodiments focuses on different technical details, the main technical features are the same for each of the above embodiments. Certain parts not described in each embodiment in detail can be found in the detailed description of the specification, and are not repeated redundantly.

As described above, the present invention has been described with preferred embodiments thereof, and it is understood that many changes and modifications to the described embodiment can be carried out without departing from the scope and the spirit of the invention that is intended to be limited only by the appended claims.

What is claimed is:

1. A method for manufacturing a liquid crystal alignment film, comprising steps of:
    disposing a liquid crystal cell onto a platform of a first reaction apparatus, and controlling a temperature range, a voltage range and an ultraviolet radiation for the liquid crystal cell, so that a liquid crystal alignment monomer in the liquid crystal cell generates a polymerization reaction;
    determining whether a period of time of the liquid crystal cell staying in the first reaction apparatus reaches a transferring time threshold value;
    transferring the liquid crystal cell to a second reaction apparatus if the transferring time threshold value is reached;

determining whether the liquid crystal cell is transferred to the second reaction apparatus or not;
if the liquid crystal cell is transferred to the second reaction apparatus, then returning the period of time of the liquid crystal cell in the second reaction apparatus to zero and re-counting the time;
if the liquid crystal cell is not transferred to the second reaction apparatus, executing a warning by means of a sound, a flash, and/or a message for moving out the liquid crystal cell;
determining whether the time of the liquid crystal cell staying in the first reaction apparatus reaches a dangerous time threshold value; and
lifting the liquid crystal cell away from the platform of the first reaction apparatus through an ejector pin disposed in the platform thereof if the dangerous time threshold value is reached.

2. The method for manufacturing a liquid crystal alignment film according to claim 1, wherein the transferring time threshold value is 4 to 5 minutes, and the dangerous time threshold value is 5 to 6 minutes.

3. The method for manufacturing a liquid crystal alignment film according to claim 1, wherein in the step of lifting the liquid crystal cell away from the platform of the first reaction apparatus through the ejector pin disposed in the platform thereof if the dangerous time threshold value is reached, a length of the ejector pin is greater than or equal to 5 mm.

4. The method for manufacturing a liquid crystal alignment film according to claim 1, wherein before the step of disposing the liquid crystal cell onto the platform of the first reaction apparatus, further comprising steps of:
preparing a liquid crystal mixture comprising liquid crystal molecules and the liquid crystal alignment monomer; and
preparing the liquid crystal cell comprising a first substrate and a second substrate, wherein the liquid crystal mixture is injected therebetween and then the first substrate and the second substrate are sealed for forming the liquid crystal cell.

5. A method for manufacturing a liquid crystal alignment film, comprising steps of:
disposing a liquid crystal cell onto a platform of a first reaction apparatus, and controlling a temperature range, a voltage range and an ultraviolet radiation for the liquid crystal cell, so that a liquid crystal alignment monomer of the liquid crystal cell generates a polymerization reaction;
determining whether a period of time of the liquid crystal cell staying in the first reaction apparatus reaches a transferring time threshold value;
transferring the liquid crystal to a second reaction apparatus if the transferring time threshold value is reached;
determining whether the liquid crystal cell is transferred to the second reaction apparatus or not;
executing a warning if the liquid crystal cell is not transferred to the second reaction apparatus;
determining whether the period of time of the liquid crystal cell staying in the first reaction apparatus reaches a dangerous time threshold value; and
lifting the liquid crystal cell away from the platform of the first reaction apparatus through an ejector pin disposed in the platform thereof if the dangerous time threshold value is reached.

6. The method for manufacturing a liquid crystal alignment film according to claim 5, wherein the transferring time threshold value is 4 to 5 minutes, and the dangerous time threshold value is 5 to 6 minutes.

7. The method for manufacturing a liquid crystal alignment film according to claim 5, wherein after the step of determining whether the liquid crystal cell is transferred to the second reaction apparatus or not, further comprising a step of:
if the liquid crystal cell is transferred to the second reaction apparatus, then returning the period of time of the liquid crystal cell in the second reaction apparatus to zero and re-counting the time.

8. The method for manufacturing a liquid crystal alignment film according to claim 5, wherein if the liquid crystal cell is not transferred to the second reaction apparatus, the step of executing the warning comprises:
executing the warning by means of a sound, a flash, and/or a message for moving out the liquid crystal cell.

9. The method for manufacturing a liquid crystal alignment film according to claim 5, wherein in the step of lifting the liquid crystal cell away from the platform of the first reaction apparatus through the ejector pin disposed in the platform thereof if the dangerous time threshold value is reached, a length of the ejector pin is greater than or equal to 5 mm.

10. The method for manufacturing a liquid crystal alignment film according to claim 5, wherein before the step of disposing the liquid crystal cell onto the platform of the first reaction apparatus, further comprising steps of:
preparing a liquid crystal mixture comprising liquid crystal molecules and the liquid crystal alignment monomer; and
preparing the liquid crystal cell comprising a first substrate and a second substrate wherein the liquid crystal mixture is injected therebetween and then the first substrate and the second substrate are sealed for forming the liquid crystal cell.

11. A liquid crystal alignment film reaction apparatus for manufacturing a liquid crystal alignment film through a polymerization reaction processed in a liquid crystal cell, comprising:
a temperature control module disposed on a platform adapted to preset a temperature range;
a voltage module adapted to provide a default voltage range;
an ultraviolet module adapted to provide a default illumination ultraviolet light;
a timing module adapted to count a time after the liquid crystal cell is disposed onto the platform;
a first determining module adapted to determine whether a current counting time reaches a transferring time threshold value;
a transfer module adapted to transfer the liquid crystal cell to a second reaction apparatus if the current counting time reaches the transferring time threshold value;
a second determining module adapted to determine whether the liquid crystal cell is transferred to the second reaction apparatus or not;
a warning module adapted to execute a warning if the liquid crystal cell is not transferred to the second reaction apparatus;
a third determining module adapted to determine whether the current counting time reaches a dangerous time threshold value; and
a control module adapted to lift the liquid crystal cell away from the platform through an ejector pin disposed in the platform if the dangerous time threshold value is reached.

12. The reaction apparatus according to claim 11, wherein the transferring time threshold value is 4 to 5 minutes, and the dangerous time threshold value is 5 to 6 minutes.

13. The reaction apparatus according to claim 11, wherein a length of the ejector pin is greater than or equal to 5 mm.

14. The reaction apparatus according to claim 11, wherein the warning module executes the warning by means of a sound, a flash, and/or a message.

* * * * *